UNITED STATES PATENT OFFICE.

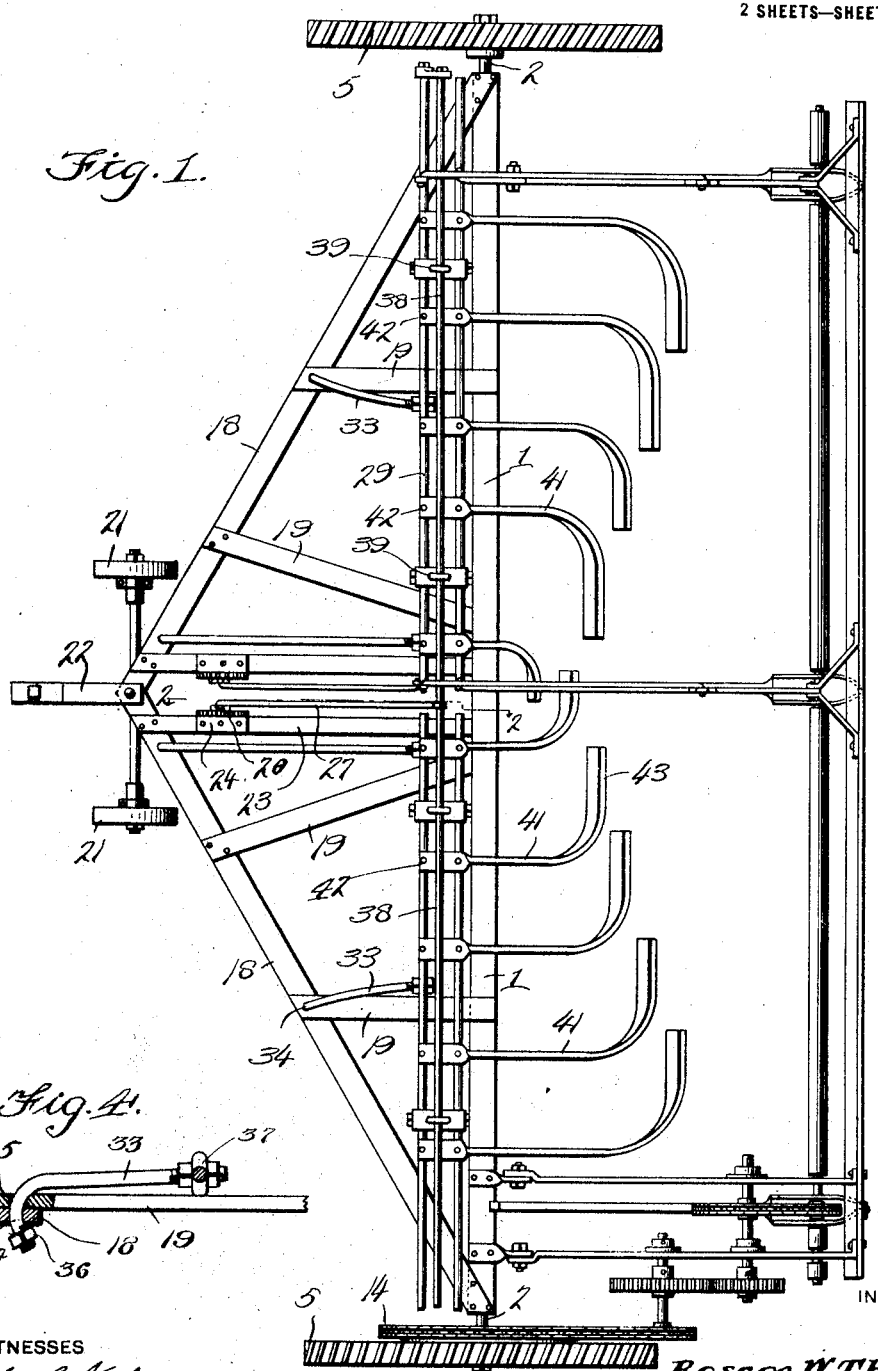

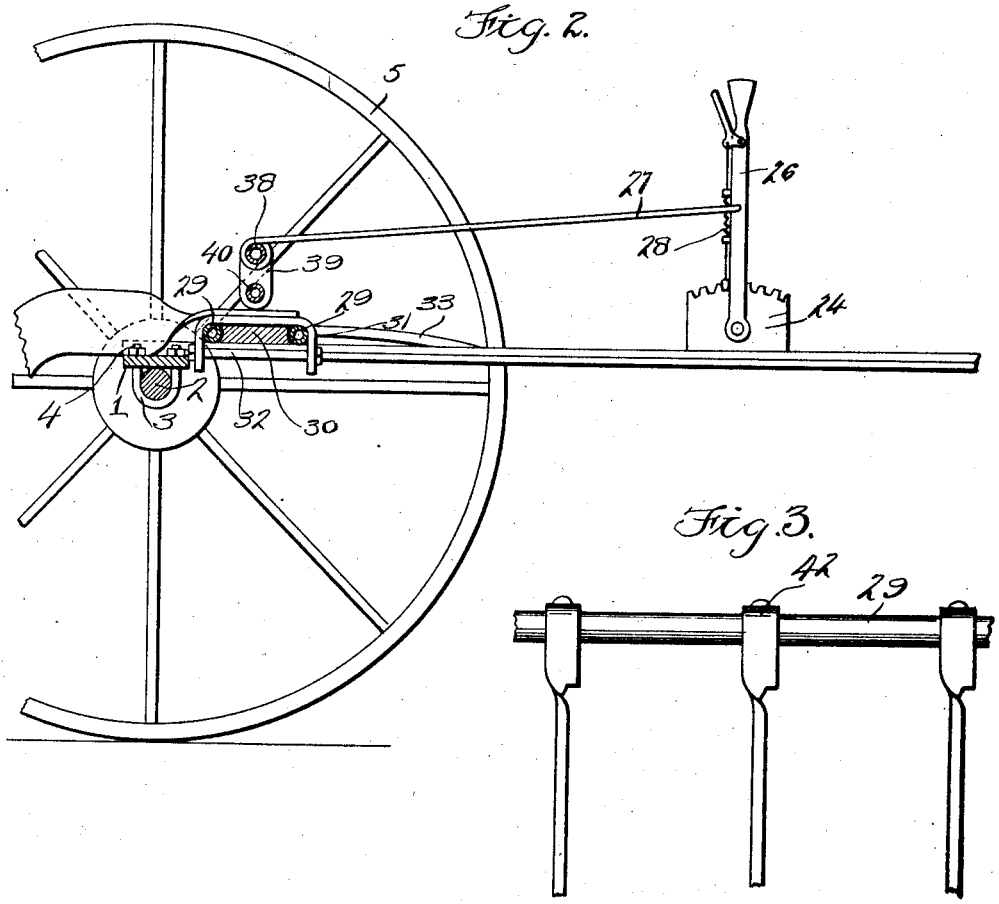

ROSCOE WALTER THAYER, OF LACROSSE, WASHINGTON.

CULTIVATOR.

1,344,833.   Specification of Letters Patent.   Patented June 29, 1920.

Application filed June 13, 1917, Serial No. 174,576. Renewed November 18, 1919. Serial No. 338,822.

*To all whom it may concern:*

Be it known that I, ROSCOE W. THAYER, a citizen of the United States, residing at Lacrosse, in the county of Whitman and State of Washington, have invented certain new and useful Improvements in Cultivators, of which the following is a specification.

My invention relates to improvements in cultivators, and it consists in the constructions, combinations, and arrangements herein described and claimed.

An object of my invention is to provide a cultivator including a movable wheel supported frame having mounted thereon a plurality of cutting knives arranged in such relative position that when they are engaged with the ground, a region comprising a width represented by the knives at the extreme ends of the frame will be worked.

Other objects and advantages will appear from the following specification, reference being had to the accompanying drawings, in which:

Figure 1 is a plan view of the cultivator,

Fig. 2 is a cross section on the line 2—2 of Fig. 1 looking in the direction of the arrow, Fig. 3 is a detail view of a portion of one of the knife carrying bars, and Fig. 4 is a detail sectional view showing the pivotal support for the knife carrying frame.

In carrying out my invention I provide a main supporting cross bar 1 beneath which a supporting axle 2 is secured by suitable clips 3 and nuts 4 as shown in Fig. 2. The axle 2 is fixed beneath the main supporting bar 1 and supports ground wheels 5 at the opposite ends thereof.

The main frame of the cultivator also includes the forwardly converging frame members 18 which are suitably braced from the main frame bar 1 by brace members 19. The forward and connected ends of the frame members 18 support a wheel carriage 20 upon which caster wheels 21 are mounted.

A clevis 22 is also joined at the forwardly connected ends of the frame members 18, and affords a connecting means whereat a suitable source of power may be applied.

The supporting frame of the cultivator also includes a pair of bridge bars 23 which as shown in Fig. 1 are arranged in parallelism, and one of the bars 23 supports a quadrant bracket 24. A knife frame elevating lever 26 is fulcrumed upon the quadrant bracket 24. The lever 26 includes suitably positioned hand operated detents 28 by which the adjustment of the lever 26 with relation to the quadrant 24 is maintained.

The knife carrying frame is mounted upon the cultivator frame 1 and as will be seen in Fig. 1, consists of a pair of tubular members 29 arranged in parallelism. The tubular members 29 are held in spaced relationship by blocks 30 which are fitted therebetween, the blocks being spaced from each other. The frame member is clamped together by metallic clips 31 which are looped thereover as shown in Fig. 2 and secured by the bolts 32. The knife carrying frame 29 is separated centrally of the machine as indicated in Fig. 1, to permit of relative movement as when the machine moves over uneven ground.

The frame 29 is pivotally hung upon the cultivator frame 1 by fulcrum bars 33 which, as shown in Fig. 4 are curved as at 34. The curved portions 34 of the fulcrum bars 33 enter curved guide ways 35 formed as a juncture of the brace members 19 and the frame members 18 and are limited in their movement in one direction by nuts 36. The fulcrum bars 33 are secured to the forward one of the tubular frame members 29 as shown at 37. The knife supporting frame 29 is movable in the vertical direction upon an arc of a circle centering at the curved portion 34 of the fulcrum bars.

A lift rod 38 is disposed over the frame 29 as shown in Fig. 1 and is provided with pivoted hangers 39 by which the knife carrying frame 29 is hung upon the lift bar 38. By reference to Fig. 2 it will be observed that a second hanger bar 40 is disposed directly beneath the lift bar 38, this bar 40 being connected to the knife carrying frame in any suitable manner to afford a rigid connection therewith of the hangers 39.

A link 27 is connected with the lift bar 38 at one end and with the knife frame lifting lever 26 at the other end. It should be understood that the link members 39 are formed rigidly with the lift rod 38 so that upon forward movement of the lever 26 the entire knife carrying frame 29 will be lifted accordingly to the distance that the lever 26 is moved.

Knives 41 are secured at 42 to the members of the knife carrying frame 29. The blades of the knives 41 are bent midway their length at right angles and are then curved downwardly and inwardly as shown in the drawings. The inwardly curved portions 43 of the knives 41 are so correlatively arranged that the entire space between the knives at the extremity of the frame of the cultivator will be cultivated and growths of weed etc. will be cut away. Should it be found that the knives 41 are cutting too deeply into the ground, the lever 26 may be rocked upon its fulcrum and the knife carrying frame 29 accordingly elevated so that the cutting edges 23 of the knives 41 will enter less deeply into the ground.

The operation of the device is as follows: Upon moving the cultivator onto a field to be cultivated the knives 41 are lowered until the cutting edges 43 engage the ground to the desired depths by adjusting the knife frame lever 26. It will be observed that the lowering of the knife frame 29 is accomplished through the medium of the lifting bar 38 and its connection 27 with the lever 26. It will be recalled that the link 39 is a rigid member with the bar 40 which in turn is secured in any suitable manner to the clips 31 shown very clearly in Fig. 2. It will also be understood that the vertical and arcuate movements of the knife frame 29 is accomplished through the medium of the fulcrum bars 33 which are pivotally secured in the opening 35 of the frame 18 and the braces 19.

As previously stated, the ends 43 of the knives 41 extend a sufficient lateral distance so that the shank of one blade is covered by the end of the companion blade. The purpose is to cut all of the ground between the blades. It will also be observed that by cutting the ground, the roller 50 runs in broken soil practically its entire length. As an incidental feature of the construction it may be mentioned that should it be required to employ more than one dog 11 to coöperate with the ratchet 7, the desired number of dogs may be mounted in the hub 6 similarly as the dog 11 is mounted as shown in Fig. 4. It is also preferable to provide a dog ratchet for each of the ground wheels 5.

It will be understood that the independent connection of the knives 41 facilitates the removal of one of them for the purpose of renewal or sharpening. The knives 41 are twisted at right angles to the flat securing bases thereof as illustrated in Fig. 3. The knives 41 are thus laterally resilient and upon engaging an obstruction upon the ground will spring sidewise.

While the construction and arrangement of the device as illustrated in the accompanying drawings is that of a generally preferred form, obviously modifications and changes may be made without departing from the spirit of the invention or the scope of the claim.

What I claim is:

In a device of the class described, the combination of a main frame, a knife carrying frame positioned upon said main frame, knives connected to said knife carrying means, said main frame having curved guideways formed therethrough, fulcrum bars having curved end portions extending through said guideways, said fulcrum bars also being fixedly connected to said knife carrying frame and means for moving said knife carrying frame, thus causing the curved ends of said bars to ride through the curved guideways and thus permitting movement of said knife carrying frame.

In testimony whereof I affix my signature in presence of two witnesses.

ROSCOE WALTER THAYER.

Witnesses:
 IRA M. CAMP,
 JOSEPH HANKINSON.